July 3, 1928.
D. L. MIDDENDORF
1,675,952
PROCESS AND APPARATUS FOR PRODUCING CRACKLED GLASSWARE
Filed Aug. 6, 1926 2 Sheets-Sheet 1
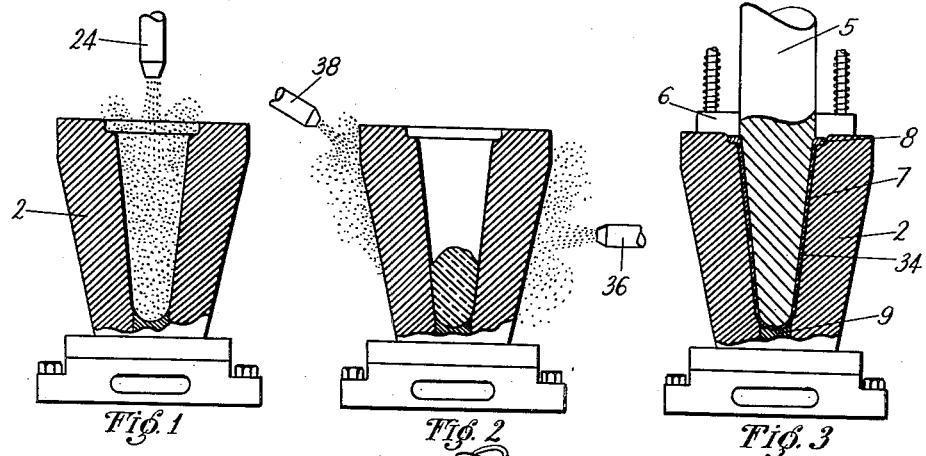
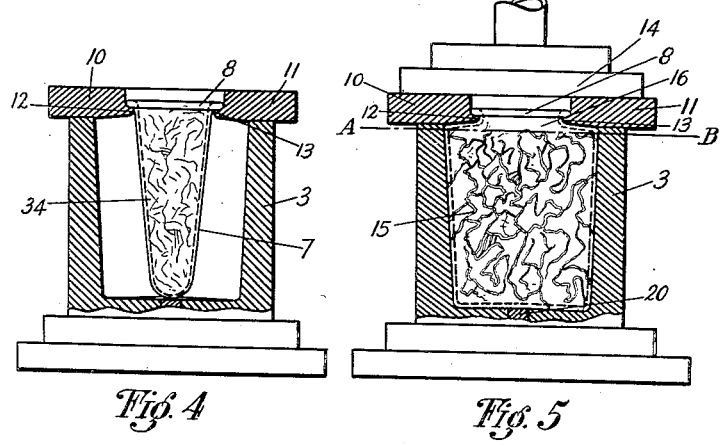
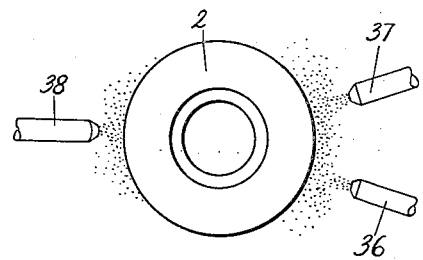
David L. Middendorf
INVENTOR.
BY
Edwin P. Corter
ATTORNEY.

July 3, 1928.  
D. L. MIDDENDORF  
1,675,952  
PROCESS AND APPARATUS FOR PRODUCING CRACKLED GLASSWARE  
Filed Aug. 6, 1926   2 Sheets-Sheet 2
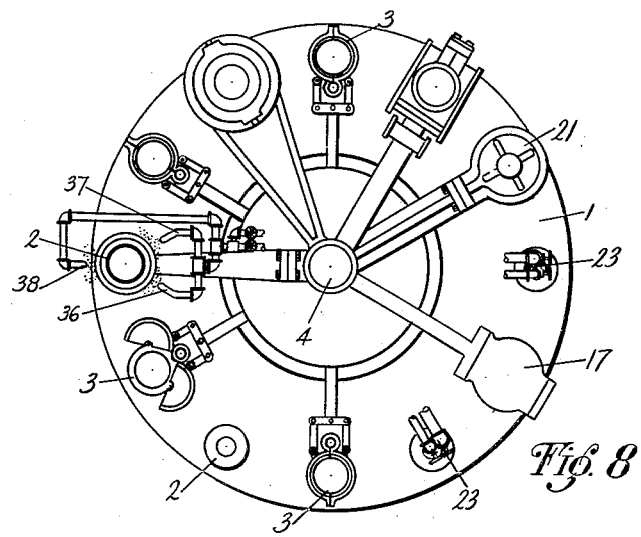
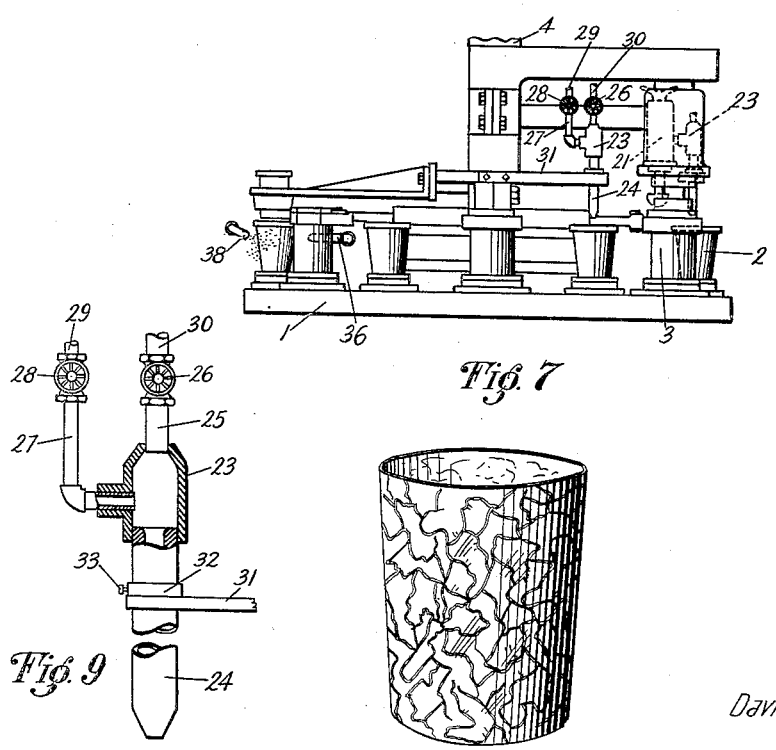
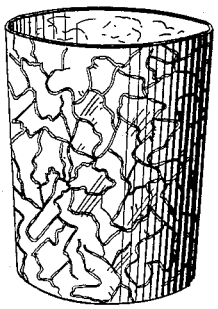
David L. Middendorf  
INVENTOR.

Patented July 3, 1928.

1,675,952

UNITED STATES PATENT OFFICE.

DAVID L. MIDDENDORF, OF COLUMBUS, OHIO, ASSIGNOR TO THE FEDERAL GLASS COMPANY, OF COLUMBUS, OHIO, A CORPORATION OF OHIO.

PROCESS AND APPARATUS FOR PRODUCING CRACKLED GLASSWARE.

Application filed August 6, 1926. Serial No. 127,669.

My invention relates broadly to a process and apparatus for producing crackled glassware, and, more particularly, to a method of covering either or both surfaces of a blank with a network of fine lines and cracks which are subsequently enlarged when the blank is shaped to final form.

Heretofore, in the manufacture of imitation crackled glassware, it has been the practice to form the articles in the mold having a relief design cut in its interior surface to produce an intaglio design on the interior surface of the article. The resulting product is not genuine crackled glassware but only an imitation, and the method necessitates the use of sectional molds which produce objectionable "fins" on the article. Moreover, all articles produced have exactly the same surface design. Likewise, it is not possible to produce a design on the interior surface of the article by this method.

The primary object of my invention is the provision of a method and apparatus for manufacturing crackled or crazed glassware, i. e., glassware the surface of which is covered with a network of fine cracks and grooves.

Other objects of my invention will appear from the following description, and its various features are illustrated in the accompanying drawings wherein similar reference numerals designate corresponding parts in the several figures and wherein Figure 1 is a side elevation, partly in section, showing a blank forming mold in position under a spraying nozzle.

Figure 2 is a side elevation, partly in section, showing a blank mold with a charge of glass therein with a nozzle for directing a spray against the exterior of the mold.

Figure 3 is a side elevation, partly in section, showing a blank forming mold, pressing plunger, ring mold and pressed parison.

Figure 4 is a side elevation, partly in section, showing a blow mold having a parison positioned therein.

Figure 5 is a side elevation, partly in section, showing a blow mold having a blown parison therein and a blow head coacting with the mold.

Figure 6 is a plan view of Figure 2.

Figure 7 is a fragmentary side elevation of a glass forming machine showing the press and blow mold and the location of my nozzle mold and blank spraying devices with reference thereto.

Figure 8 is a plan view of Figure 7 showing press and blow molds, pressing mechanism, transfer mechanism, fire polishing device, blow head and my novel mold and blank spraying mechanism with reference thereto.

Figure 9 is a partly sectional elevational view showing the interior of the atomizer.

Figure 10 is a perspective view of a tumbler.

In the drawings, one illustrative embodiment of my invention is shown in association with a glass forming machine of the press and blow type which comprises a mold carrying table 1 upon which the parison or blank mold 2 and the blow molds 3 are alternately arranged in a substantially circular path about the center post 4, as shown in Figures 7 and 8.

Forming machines of the press and blow type are usually provided with a reciprocable plunger 5 and ring mold 6 (Figure 3) which are adapted to cooperate with the blank molds 2 to press a blow blank or parison 7 having a bead portion 8, from a previously deposited mass of glass. Suitable quantities of molten glass may be deposited in the successively presented blank molds 2 in any approved manner, as for instance, by an automatic feeding machine or manually.

After the blow blank 7 and its bead portion 8 have been formed as just described, the plunger 5 and the ring mold 6 may be elevated and the reciprocable ejector 9 operated to lift the blow blank 7 and bead 8 out of contact with the blank mold 2. Suitable transfer mechanism may now come into operation and lift the blank mold completely out of the blank mold 2 and deposit it in the blow molds 3, the shape of which varies according to the size and shape of the article being produced.

The blow mold 3 is preferably, but not necessarily, of the non-sectional type and may be provided with a neck ring yoke or sectional covers 10 and 11 formed with complementary shoulders 12 and 13 which are adapted to support the blow blank 7 by its bead portion 8 in the manner shown in Figure 4. After the blow blank has been positioned within the blow mold 3, as shown in Figure 4, a suitable fluid pressure blow head 14 may be moved onto the cover members 10 and 11 and the blank 7 expanded or blown into forming contact with the mold 3, to form an integral article 15, hood portion 16 and bead 8, as shown in Figure 5. Air or other suitable fluid may be utilized for expanding or blowing the blank 7, and when the blowing has been completed, the blow head 14 may be elevated by means of a fluid pressure cylinder or other suitable means.

The cover members 10 and 11 are opened by means of operating cams (not shown). The reciprocable ejector 20 is elevated to raise the formed article out of contact with the blow mold 3 and the formed article then removed from the blow mold. In the usual subsequent operations, the formed article is then annealed; the hood portion 16 and bead 8 cracked off along the line A—B; the top edges given a heat treatment and the article is then ready for sale.

The structural features of the forming machine and its operation will not be described in detail because such description is unnecessary to an understanding of my invention. It may, however, be mentioned that the mold table 1 is given a step-by-step rotary motion by suitable mechanism (not shown) for carrying the press molds 2 and the blow molds 3 to the successive stations where the different operations as above described are performed.

Under some conditions, it may be desirable to fire polish the interior of the blank 7 before it is blown, and for this purpose I may employ a fire head or burner 21 which is, preferably, vertically reciprocable above and in alignment with the blow mold 3 by means of a fluid pressure cylinder or other suitable device 22. In the operation of this burner 21, when a blow mold 3, in which a pressed blank 7 has been positioned, is carried under the burner 21, an intense flame issues therefrom and impinges upon the interior surface of the blank and imparts a brilliant finish to such surface before the blank is blown in the manner previously described. It will be understood that the burner 21, or a similar device, may be employed for fire polishing the interior of the article after blowing and that such interior may be fire polished both before and after blowing if desired.

In connection with the above-described process of manufacturing glass articles, by pressing and blowing, my invention contemplates a method and apparatus for crackling or crazing the exterior or interior surfaces or both surfaces of the article being produced. In general, my invention provides means for covering the exterior surface of a press blank with a network of fine lines or cracks which are subsequently enlarged when the blank is blown. Means is also provided for crackling or crazing the interior surface of a press blank before blowing so that both the interior and the exterior surfaces of an article may be crackled if desired. It is understood that the particular embodiment of my invention hereafter described may be varied to accommodate it to different makes of forming machines and different types of ware.

In combination with the forming machine heretofore described, I have provided atomizers 23 which comprise a nozzle 24, an air inlet 25, controlled by a suitable valve 26, and a water inlet 27, controlled by a suitable valve 28. Water and air are supplied to the respective inlets by conduits 29 and 30 and the entire atomizers may be supported above and in alignment with the path of the molds 2 and 3 by means of a bracket 31. A collar 32, secured in place upon nozzle 24 by means of a set-screw 33, permits vertical adjustment of the nozzle 24 with respect to the molds 2 and 3.

Atomizers 23 may be positioned in alignment with one or more of the places where the blank molds 2 stop before the masses of glass are deposited therein. In the present embodiment of my invention, I use three of such atomizers 23. Two of these atomizers 23 have the nozzles 24 vertically positioned above the blank molds 2 so as to direct a spray of fluid directly into the interior of the blank molds 2. One of these two atomizers is located above the mold table between fire polisher 21 and blow head 17 station, as best shown in Figure 8. The other of these two atomizers 23 is located between the blow head station 17 and the blow mold 3, as best shown in Figure 8.

In addition to the above-described atomizers 23, having vertically disposed nozzles 24, in the present embodiment of my invention, I also use an atomizer 23 which directs a spray against the exterior side walls of the blank mold 2. This lateral atomizer 23 is constructed the same as the vertically disposed atomizer as above described, with the exception that it has triple nozzles 36, 37 and 38. Nozzles 36 and 37 are disposed at right angles to the molds so that they throw a spray of fluid which strikes the molds on the exterior sides at about the center. The other nozzle, 38, is positioned so that the spray therefrom is directed at the top portion of the mold. The liquid from this nozzle 38, of course, flows downwardly on the exterior side of the mold. By the use of these lateral atomizers, the mold is kept at the proper temperature to obtain the best results in the crackled ware.

The lateral atomizer with nozzles 36, 37 and 38 is positioned on the mold table at the point where the blank mold stops to receive the charge of glass, that is, directly under the spout, as shown in Figure 8. By suitably adjusting the air valve 26 and the water valve 28, a mist or vapor may be expelled from the end of both the vertical and lateral nozzles, as shown in Figures 1 and 2.

This mist or vapor impinges upon the interior and exterior surfaces of the successively presented blank molds 2 and results in chilling or cooling the surface of the mold to such an extent that when a mass of glass is deposited in the blank mold and pressed, the exterior surface of the resulting blank 7 will be covered with a network of fine lines and cracks 34, as best shown in Figures 3 and 4. These cracks and lines 34 are confined to the surface and do not extend through the blank. The blank 7 may now be transferred to a blow mold 3 in the usual manner and blown, when the small lines and cracks 34 will be enlarged and widened by the stretching and expansion of the blank during blowing.

The appearance of the blown article is shown in Figure 10 and it will be noted that the cracks 35 are larger and wider than the cracks and lines 34 in the blow blank 7. The articles produced may be subsequently decorated by filling the cracks 35 to make inlaid glassware. Since the blow molds 3 travel under the nozzle 24 of the atomizer 23 after the pressed blanks have been positioned therein and before it reaches the blowing station 14, as shown in Figure 8, the result is that the interior surface of the pressed blanks are also slightly cracked by the mist or vapor and these cracks are also enlarged during blowing, so that both the exterior and interior surfaces of the completed article are cracked or crazed. Obviously, this cracking of the interior may be prevented by swinging the nozzle 24 of the vertically positioned atomizer 23 out of alignment when the blow mold travels thereunder, or by interposing a deflector between the end of the nozzle 24 and the blow mold 3 or by discontinuing the expulsion of vapor while the blow mold travels beneath the nozzle 24. This may be done automatically or otherwise.

It is also obvious that interior surface alone may be crackled by impinging a mist against such surface before blowing and omitting the step of cooling the blank molds in the manner previously described. The extent to which the exterior surface is crackled may be controlled and varied to some extent by regulating the quantity of vapor admitted to the blank molds and the extent to which the interior surface is crackled may also be controlled by regulating the quantity of vapor admitted to the interior of the blanks 7.

It will, of course, be understood I do not limit myself to the number of vertical or lateral atomizers shown but that I reserve the right to use as many vertical or lateral atomizers as the mold table will accommodate. It will also be understood that, while I have shown the vertically disposed atomizers separately from the lateral atomizers, atomizers may be used which combine both the vertical and the lateral nozzles. It will also be understood that an atomizer may be used which throws a continuous or intermittent spray of liquid either against the interior or exterior mold surfaces or both, without departing from the scope of my invention.

I do not desire to limit my invention to the use of water and air, because other liquids may be employed and other methods of atomizing liquids are well known and may be employed in lieu of the air jet previously described.

From the foregoing description, it will be obvious that my invention provides a novel method of crackling glassware which does not necessitate the use of engraved molds or the duplication of designs, and which is adaptable to mechanical and automatic methods of manufacturing glassware.

I claim—

1. The method of producing crackled ware which comprises causing a fluid to play upon the mold exterior so as to maintain the interior of the mold at such temperature at which crackling of the ware being formed therein will be effected.

2. The method of producing crackled ware which comprises causing a moisture laden spray to play upon the mold exterior so as to maintain the interior of the mold at such temperature at which crackling of the ware being formed therein will be effected.

3. The method of producing crackled ware which comprises causing a fluid in the form of sprays of moisture laden air to play upon the mold exterior so as to maintain the interior of the mold at such temperature at which crackling of the ware being formed therein will be effected.

4. The method of producing crackled ware which comprises introducing moisture into the interior of the mold before deposit of the glass therein, and causing a fluid to play upon the mold exterior so as to maintain the interior of the mold at such temperature at which crackling of the ware being formed therein will be effected.

5. The method of producing crackled ware which comprises directing a moisture laden spray into the interior of the mold before deposit of the charge of glass therein, and causing a moisture laden spray to play upon the exterior so as to maintain the interior of the mold at such temperature at which crackling of the ware being formed therein will be effected.

6. In combination with press and blow apparatus, a plurality of nozzles for spraying moisture onto the exterior of the mold so as to maintain the interior of the mold at such temperature at which crackling of the ware being formed therein will be effected.

7. In combination with press and blow apparatus, a nozzle for spraying moisture into the interior of the mold before deposit of the charge of glass therein, means for adjusting said nozzle toward and away from said mold, and a plurality of nozzles for spraying moisture onto the exterior of the mold so as to maintain the interior of the mold at such temperature at which crackling of the ware being formed therein will be effected.

8. In combination with press and blow apparatus, means for spraying moisture into the interior of the mold before the charge is placed therein, and means for spraying moisture onto the exterior of the mold while the mold is being charged with glass so as to maintain the interior of the mold at such temperature at which the crackling of the ware being formed therein will be effected.

9. In combination with press and blow apparatus, means for spraying the interior and exterior surfaces of the mold with moisture laden air of sufficient quantity and quality so as to produce crackling of the ware being formed therein and without changing the temperature of the blank to a degree that will prevent proper shaping thereof.

10. In combination with press and blow apparatus, means for spraying the interior and exterior surfaces of the mold with a fluid of a quantity and quality sufficient to produce crackling of the ware being formed therein and without changing the temperature of the blank to a degree that will prevent proper shaping thereof.

11. In combination with apparatus for shaping glass articles in molds, means for spraying moisture onto the exterior of the molds so as to maintain the interior of the mold at such temperature at which crackling of the ware being formed therein will be effected.

In testimony whereof I hereby affix my signature.

DAVID L. MIDDENDORF.